Figure 1:
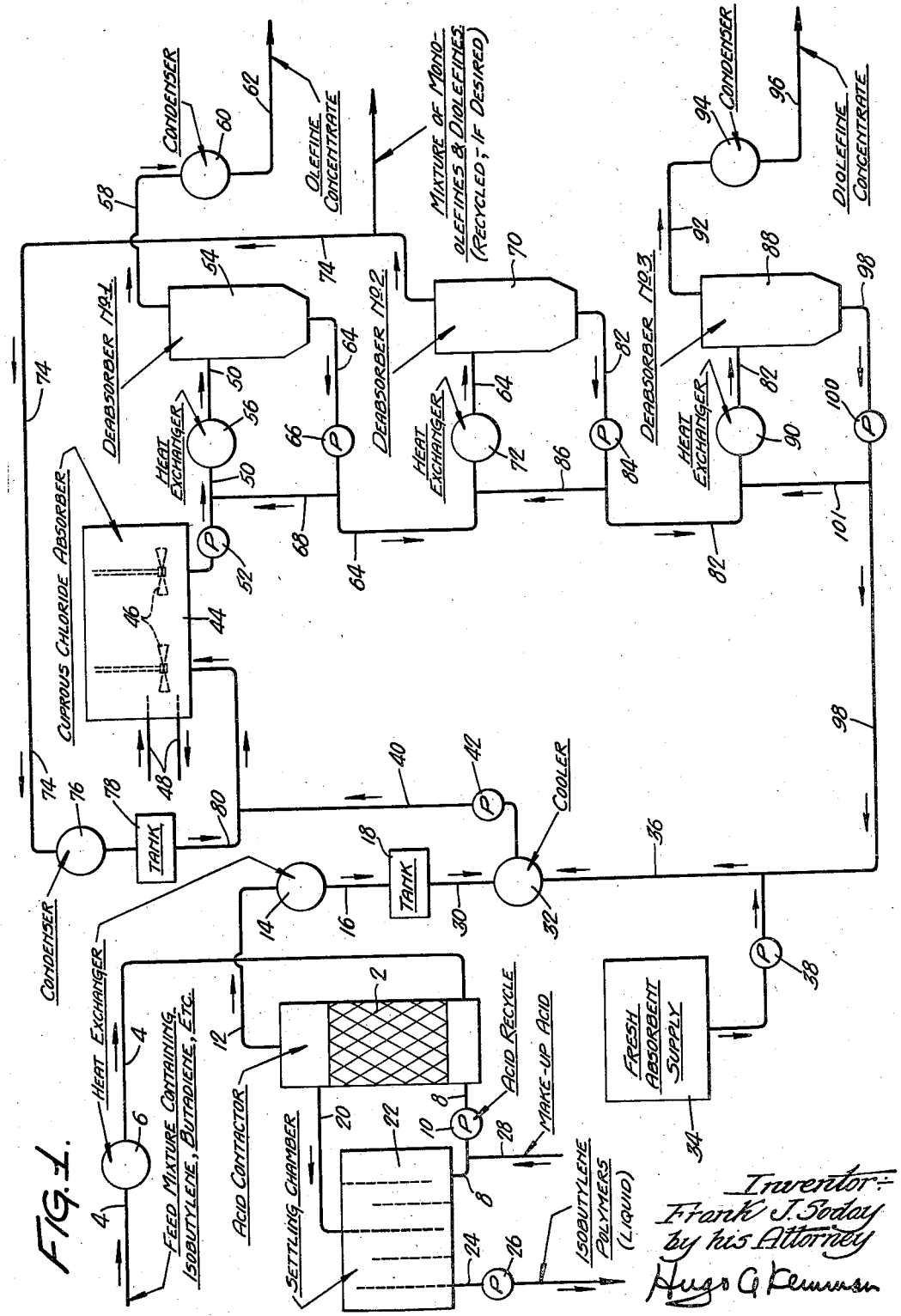

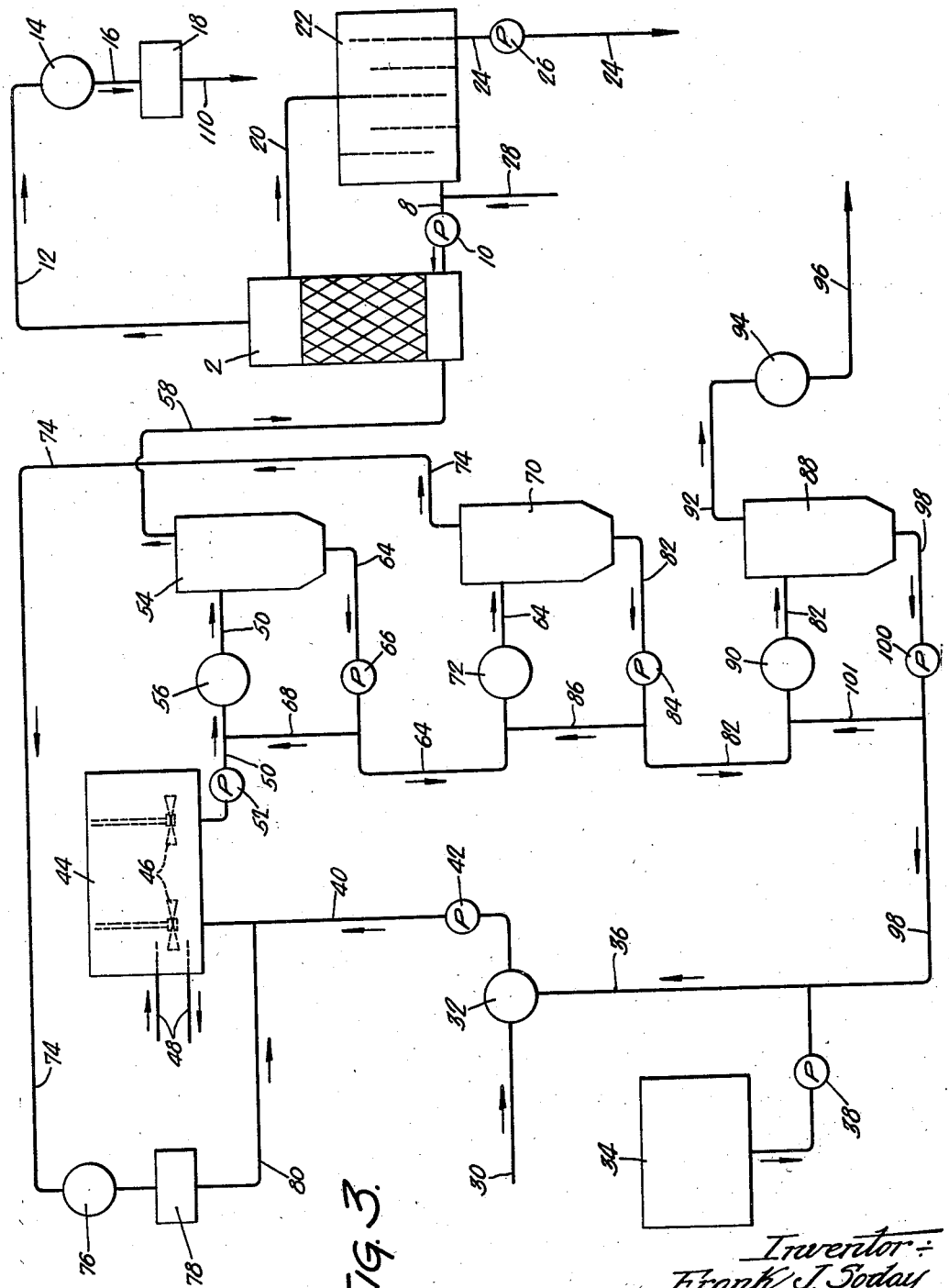

Patented July 1, 1947

2,423,414

UNITED STATES PATENT OFFICE 2,423,414

PROCESS FOR RECOVERING DIOLEFINS FROM HYDROCARBON MIXTURES

Frank J. Soday, Baton Rouge, La., assignor to The United Gas Improvement Company, a corporation of Pennsylvania Application April 7, 1943, Serial No. 482,175

6 Claims. (Cl. 260—681.5)

This invention relates to the treatment of hydrocarbon mixtures containing both diolefine hydrocarbons and olefine hydrocarbons for the separation of same.

More particularly, the invention relates to a method for recovering diolefine hydrocarbon material from hydrocarbon mixtures containing in addition thereto other unsaturated hydrocarbon material such as one or more monoolefines, and particularly one or more isoolefines.

It is an object of the invention to provide a process for treating a mixture of various unsaturated hydrocarbons, including diolefine material and monoolefine material, according to which process the diene material may be recovered in highly purified form and in good yield.

Another object of my invention is to provide a process by which a hydrocarbon mixture containing one or more aliphatic diolefines and one or more aliphatic mono-olefines, particularly isoolefines, either with or without the presence of one or more acetylenic hydrocarbons and/or one or more saturated aliphatic hydrocarobns, may be treated for the isolation of the particularly valuable aliphatic diolefine, or diolefines, in highly purified form.

A still further object of the invention is the provision of a method for separating isobutylene from liquids or gases containing the same in admixture with butadiene, with or without the presence of saturated aliphatic hydrocarbons and/or acetylenic hydrocarbons of generally similar boiling characteristics, whereby the relatively more valuable butadiene may be recovered in highly purified form for uses where a refined butadiene is necessary or desirable, such as for polymerization, either alone or with other hydrocarbons; as an intermediate in the production of other compounds; etc.

Further, another object of the invention is the provision of a method for subjecting a hydrocarbon mixture containing substantial quantities of butadiene and isobutylene to a separatory treatment for the recovery, on the one hand, of butadiene in relatively concentrated form, and the recovery, on the other hand, of isobutylene such as in the relatively more valuable dimeric—and/or higher polymeric—form suitable for separate utilization as such, or for further conversion to still more valuable products.

For convenience the following description is presented largely in terms of the treatment of mixtures of hydrocarbons containing butadiene and isobutylene as the predominating or the principal unsaturated hydrocarbon content thereof, but it is to be understood that my invention is likewise applicable to the treatment of other hydrocarbon mixtures containing other dienes and mono-olefines as predominating or as the principal unsaturates, irrespective of the number of carbon atoms per molecule of each of such constituents.

Various processes are known for the production of a combustible gas by methods wherein a petroleum oil, or a suitable fraction thereof, is pyrolytically decomposed, such as, for example, in the vapor phase and with or without the aid of catalysts. As examples of such combustible gas may be mentioned carburetted water gas and oil gas. The gas resulting from processes of this nature, as well as higher boiling pyrolysis products resulting from cooling and/or condensing the gas, is rich in valuable resin-forming hydrocarbons including aliphatic diolefines, as well as in aliphatic mono-olefine hydrocarbons, the latter term including mono-isoolefines. Saturated aliphatic hydrocarbons are also generally present in considerable quantities, as may be certain cyclic and/or aromatic hydrocarbons of both saturated and unsaturated characteristics.

Besides the foregoing types of gases, other gas-making processes are capable of yielding valuable hydrocarbon mixtures to which my invention may likewise be applied. Thus, coal gas, coke oven gas, and refinery oil gas (such as is obtained as a by-product in the petroleum oil refining industry where hydrocarbon cracking conditions are generally so regulated as to produce liquid motor fuels as the major desired product) may if desired serve as the source material for the hydrocarbon mixtures treated in accordance with my present invention.

By a method or combination of methods which per se may be well known in the art (e. g., absorption, adsorption, compression and/or refrigeration) it is comparatively easy to isolate a relatively narrow-boiling fraction from the combustible gas, said fraction comprising a mixture of saturated and unsaturated hydrocarbons preponderatingly of the same number of carbon atoms, although various hydrocarbons of a greater or lesser number of carbon atoms may be present in varying (although generally minor) degrees.

Thus, for illustration, a $C_4$ fraction may be separated from combustible gas, which fraction may predominantly comprise various individual $C_4$ hydrocarbons and relatively minor quantities of hydrocarbons of greater and of lesser numbers of carbon atoms, the ratio of the $C_4$ hydrocarbons to hydrocarbons other than $C_4$'s depending among other things upon the manner and conditions of separation thereof from the gas, as well as upon the original gas-making conditions.

Such a $C_4$ fraction may contain butadiene, butene-1, butene-2, and isobutylene, as well as saturated hydrocarbons such as butane and isobutane and/or more unsaturated hydrocarbons such as vinylacetylene. Acetylenic hydrocarbons are generally present, if at all, in very minor proportions and the concentration thereof can be reduced to negligible values by known methods; and this is preferably, but not necessarily, done prior to applying the process of my present invention to the hydrocarbon mixture. The saturated hydrocarbons, while often present in very substantial proportions, may be readily separated from the remaining unsaturated hydrocarbons by known methods, for instance such as those depending upon the greater chemical reactivity of the unsaturated hydrocarbons as compared with the chemical reactivity of the saturated hydrocarbons.

The remaining unsaturated hydrocarbons in the $C_4$ fraction, comprising butadiene on the one hand and $C_4$ mono-olefine hydrocarbons on the other, are extremely difficult to satisfactorily separate into $C_4$ mono-olefines and butadiene of sufficiently high purity and in sufficiently high yields. This is particularly true with respect to the separation of butadiene and isobutylene present in such $C_4$ fractions.

It has already been proposed to separate butadiene from its admixtures with butylenes (including the butenes, and in particular, isobutylene) by absorption with salts of heavy metals of groups IB and IIB of the periodic system, particularly monovalent salts of copper, mercury and/or silver, such as, for example, cuprous chloride, cuprous acetate, and similar salts, either dry or in solution and/or suspension in water, water containing ammonia, and the like; the separation depending in part at least upon the fact that while both the butadiene and the butylenes may be absorbed by the absorption medium, such as, for example, cuprous chloride, the resulting complexes have entirely different dissociation pressures, the butadiene-cuprous chloride complex having a dissociation pressure of only a few millimeters of mercury at room temperature, while the corresponding butylene-cuprous chloride complexes have dissociation pressures which may be as high as several atmospheres at the same temperatures, so that a selective absorption on cuprous chloride or the like salt may be obtained by a judicious choice of operating conditions. While this method may be employed when desired, and with the production of a satisfactory grade of butadiene for some purposes, it nevertheless leaves much to be desired in the way of costs of recovery and in yields, due in part at least to the fact that mono-olefines (and particularly isobutylene) which may be present in admixture with the butadiene may likewise be absorbed to some extent by the cuprous chloride, or similar absorbent, under the conditions favoring butadiene absorption.

While numerous attempts have been made to overcome the limitations imposed by the use of absorbing media such as cuprous chloride for recovering butadiene in highly purified form from admixture with butylenes, and particularly isobutylene, so far as I am aware no process heretofore proposed for the purpose is capable of substantially satisfying every important requirement, including particularly the following: reasonable costs, relatively high yields, high purity of the product butadiene; and simultaneous production of butylenes, especially isobutylene, in a form or forms which will be particularly valuable from the standpoint of separate utilization thereof, and the value of which can therefore be credited (at least in large part) to the butadiene recovery operation.

My invention is based upon the discovery that excellent results are obtained when the recovery of butadiene from hydrocarbon mixtures by means of cuprous chloride, or other monovalent salts of copper, mercury, and/or silver, either in the dry form, or in the form of a suspension and/or solution in water, which may contain ammonia or the like, is combined with the conversion of the isobutylene of said hydrocarbon mixtures to dimers and/or higher polymers thereof.

Thus, by treatment of the hydrocarbon mixture containing butadiene and isobutylene, among other hydrocarbons, with a suitable catalyst, for example a mineral acid catalyst such as sulfuric or phosphoric acid, under suitable reaction conditions, most of the isobutylene present may be selectively converted to polymers of isobutylene, such as a material preponderating in diisobutylene, whereupon the remaining hydrocarbon mixture may thereafter readily be subjected to treatment with a selective absorption agent, such as cuprous chloride or cuprous acetate in solid or solution form, for the separation and recovery of butadiene in highly purified form.

The final concentrating step preferably is carried out by contacting the partially concentrated material with either (1) finely divided dry cuprous chloride, suitably in a ball mill or similar reaction unit, (2) a slurry or suspension of cuprous chloride in water or other liquid, or (3) a solution of cuprous acetate in water containing ammonia, followed by stepwise desorption operations to isolate the butadiene present in pure form.

Alternatively, the hydrocarbon mixture may if desired be first treated with an absorption agent, such as cuprous salts, after which one or more of the hydrocarbon concentrates produced thereby may be then subjected to the action of a catalyst under suitable reaction conditions adapted to selectively convert isobutylene present in the given hydrocarbon concentrate to dimers and/or higher polymers, the latter polymers then being separated from the hydrocarbon concentrate by any desired method, such as by distillation under reduced pressure, or otherwise.

The normally liquid polymers of isobutylene obtained by any of the foregoing steps, or their equivalent, will generally largely comprise di-isobutylene, which may be readily hydrogenated to iso-octane. The di-isobutylene, being readily convertible to this valuable anti-knock hydrocarbon, therefore constitutes an important by-product of the process. Tri-isobutylene, when present, may if desired be separated and employed as a constituent of motor fuel, inasmuch as it boils within the gasoline range. Higher polymers of isobutylene, when present in the reaction product, may be separated and employed as such, or otherwise utilized as desired.

In the description which follows, my invention will be described in connection with the treatment of an unsaturated C₄ hydrocarbon fraction such as may be separated by appropriate methods from a combustible gas produced by the vapor-phase pyrolysis of petroleum oil, under temperature conditions of pyrolysis of above approximately 1100° F. and pressure conditions of approximately atmospheric, or slightly in excess thereof, which pressure refers to the total pressure in the petroleum oil pyrolysis zone.

As illustrating a typical isobutylene- and butadiene-containing unsaturated hydrocarbon mixture of the foregoing nature to which my present invention may be readily applied with particularly desirable results, may be mentioned a crude unsaturated C₄ hydrocarbon fraction separated from a combustible oil-gas produced as indicated above and having the following composition of unsaturates:

Table

|  | B. P. | Approximate Content by weight |
| --- | --- | --- |
|  | ° C. | Per cent |
| Butadiene | −4.7 | 50 |
| Isobutylene | −6.7 | 28 |
| Butene-1 | −6.7 | 10 |
| Butene-2 (Cis) | +3.7 | 4 |
| Butene-2 (Trans) | +1.0 | 3 |
| Acetylene Hydrocarbons |  | 1 |
| C₃ and C₅ Hydrocarbons |  | 4 |

In order to further illustrate my invention several embodiments thereof are described in connection with the accompanying drawings. It is to be understood however that this is merely by way of added description, and without intending thereby to in any way limit my invention to the details mentioned. Other modifications of my invention will suggest themselves to those skilled in the art upon becoming familiar with the present specification and claims.

In the drawings, Figure 1 is a flow sheet setting forth one preferred embodiment of the invention in which the step of the selective polymerization of isobutylene is applied to the C₄ hydrocarbon mixture prior to treatment thereof with absorption agent for the separation of butadiene.

Figure 2:
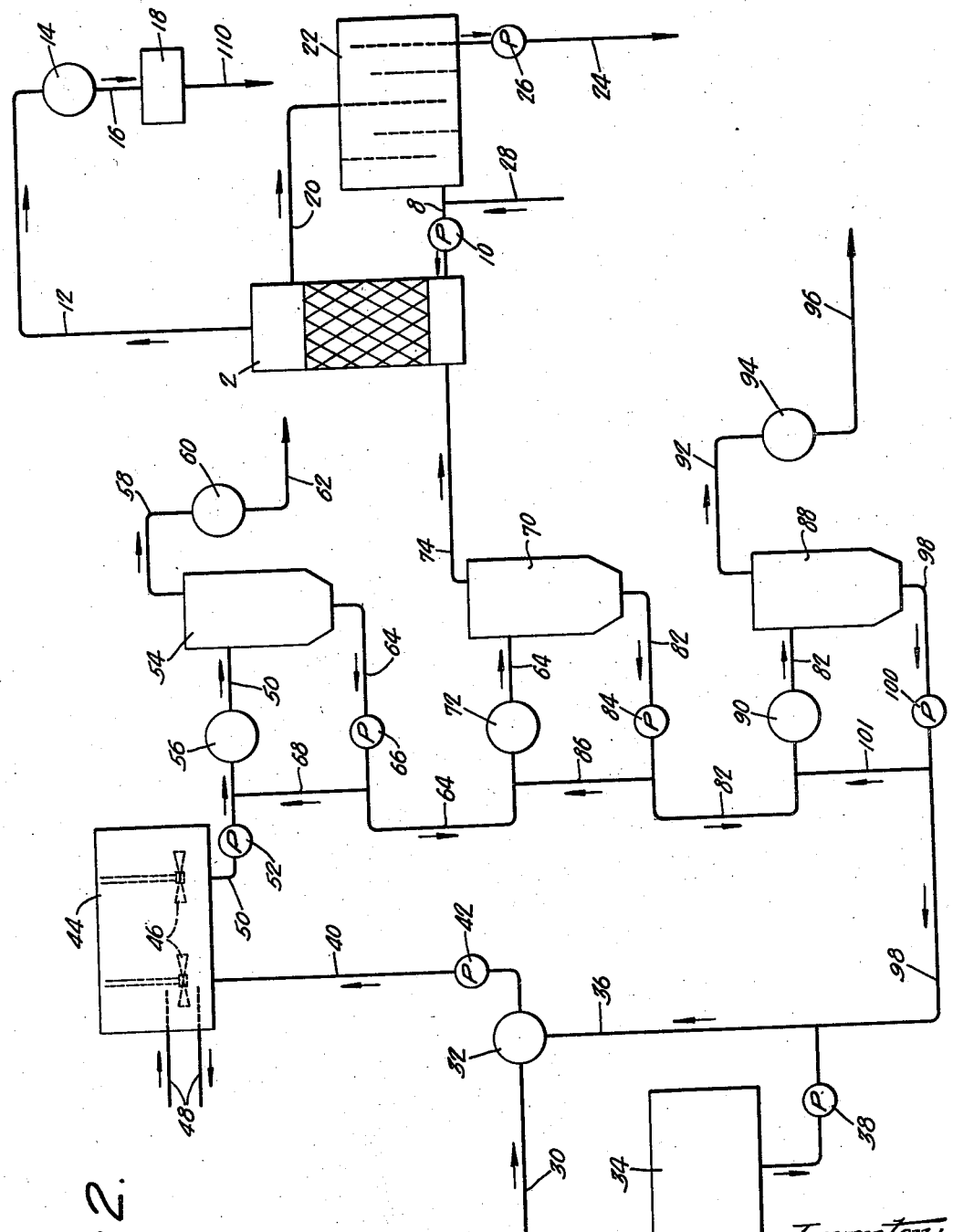

Figure 2 illustrates the treatment of a C₄ hydrocarbon mixture containing butadiene and isobutylene with an absorption agent, such as one comprising cuprous salts, subjecting the reaction product or solution to stagewise deabsorption, and subjecting the hydrocarbon mixture from an intermediate deabsorption stage and containing substantial quantities of both butadiene and isobutylene to polymerization conditions selective as to the isobutylene.

Figure 3 shows a somewhat similar arrangement but in which the step of selectively polymerizing isobutylene is applied to the hydrocarbon mixture from the initial deabsorption stage and containing a preponderant portion of monoolefines, including isobutylene, but a relatively minor portion of diolefines, including butadiene.

Referring more particularly to Figure 1, the feed mixture comprising a C₄ fraction containing butadiene and isobutylene may be introduced into polymerizing vessel 2 via feed line 4. It may be introduced thereto preferably, but not necessarily, in the vapor phase for more effective contact with the acid polymerization catalyst, and consequently heat-exchanger 6 may be provided in feed line 4 in case the C₄ fraction is charged to the system in liquid phase. Polymerizing vessel 2 may be provided with suitable packing of conventional nature or otherwise, such as refractory pieces, or it may be relatively empty.

Mineral acid polymerization catalyst, such as sulfuric acid, may be supplied to vessel 2 via line 8 and pump 10, the acid inlet being shown for convenience as located at or near the bottom of the polymerizing vessel 2. If preferred for any reason, countercurrent contact between the C₄ fraction and the acid catalyst agent might be employed, such as by admitting the acid at or near the top of the tower 2.

By suitably regulating the reaction conditions within the tower or vessel 2, for instance such as by circulating a suitable heating medium through a jacket (not shown) on said tower and/or by suitably heating the acid catalyst outside tower 2, selective polymerization of a preponderant portion of the butylenes, particularly isobutylene, may be caused to take place, the resulting polymerization product comprising largely diisobutylene with relatively minor proportions of higher isobutylene polymers and/or other reaction products of the butylenes.

The butadiene, together with unreacted butylenes and any other residual hydrocarbons that may be present, may leave polymerizing vessel 2 via line 12, and be introduced into heat-exchanger 14 and there subjected to condensation conditions. The condensed butadiene fraction may leave heat exchanger 14 via line 16 which conducts it to tank 18 for storage preparatory to the second stage of the treatment. Tank 18 may thus act as a storage tank as well as a temporary surge tank between the process stages.

Returning to polymerizing vessel 2, acid catalyst containing isobutylene polymer may be withdrawn via line 20 and introduced into separator 22. This may be of any desired construction, and as shown includes a baffle arrangement disposed in a settling vessel of relatively large capacity which permits the separation of the acid catalyst and the isobutylene polymer such as through simple layer formation.

Line 24 provided with pump 26 serves for the withdrawal of isobutylene polymer and any other separable material produced. This product may be conveyed to storage, or to separation and/or further utilization, or otherwise, as desired.

Acid catalyst (saturated with hydrocarbon polymer) may be withdrawn from separator 22 and recycled to the polymerizing vessel 2 via line 8 and pump 10. Line 28 communicating with line 8 on the inlet side of pump 10 may be provided for the introduction of makeup acid, as needed.

Returning to the crude butadiene fraction in surge tank 18, this may be withdrawn via line 30 and passed into cooler 32 in which it is mixed with cuprous salt absorbing solution and/or suspension coming from absorbent supply tank 34 via line 36 and pump 38.

The mixture of cuprous salt absorbing solution and/or suspension and crude butadiene fraction may then be passed via line 40 and pump 42 into absorber 44, which may be of any desired construction. For example, it may take the form of a vessel of relatively large capacity provided with agitating means 46 and temperature control means 48 such as a coil within the tank for circulation of a fluid heating or cooling medium. Absorber 44 is preferably a vessel adapted to withstand any superatmospheric pressure which it might be desired to impress upon the cuprous salt absorption portion of the system.

By suitably adjusting the temperature and pressure conditions obtaining in the absorption system, in conjunction with conditions of agitation and time of contact, particularly in absorber 44, complexes of cuprous salt and butadiene are obtained which are held in suspension and/or solution in the absorbing medium.

The absorbing medium containing this complex, or mixture of complexes, may be removed from absorber 44 via line 50 and pump 52 and introduced into vessel 54 for the separation and removal of monoolefine material, including any residual isobutylene. If desired, heat-exchanger 56 may be provided in line 50 to supply heat to the mixture of materials passing therethrough.

Vessel 54 is preferably constructed in a manner capable of withstanding considerable superatmospheric pressure.

By the application of heat, or by a reduction in pressure, or suitably by a combination of both of these methods, the material contained in vessel 54 may be subjected to conditions sufficiently drastic to drive off in the form of vapor the butylenes, but insufficiently drastic to dissociate any substantial proportion of the cuprous chloride-butadiene complex.

The butylene, or butylenes, thus driven off in vapor phase may be removed via line 58 which if desired may conduct them to condenser 60. The condensed monoolefine concentrate, suitably in liquid phase, may be removed from the system via line 62.

The cuprous salt absorption medium, partially stripped of monoolefines, may be withdrawn from vessel 54 via line 64 and pump 66.

Line 68 communicates with line 64 on the outlet side of pump 66 and permits the recirculation of a portion of the absorption medium to vessel 54, if such should be desired for any reason.

The absorption medium from vessel 54 (less any portion thereof which might be recycled via line 68) may be introduced into a second vessel 70 via line 64. If desired, heat-exchanger 72 may be provided in line 64 to supply heat to the material passing therethrough. Vessel 70, like vessel 54, is preferably constructed so as to be capable of withstanding considerable superatmospheric pressure.

By the further application of heat, or by a further reduction in pressure, or suitably by a combination of both of these methods, the mixture contained in vessel 70 may be subjected to conditions sufficiently drastic to drive off in the form of vapor substantially all the remaining butylenes. These conditions may be sufficiently drastic to simultaneously dissociate an appreciable, although generally relatively minor, portion of the cuprous salt butadiene complex.

The butylene, or butylenes, thus driven off in vapor phase may be removed via line 74. Since (as already indicated) an appreciable quantity of valuable butadiene may be present in the vapor-phase effluent from this intermediate stage of deabsorption, it may be economically desirable to recover same from admixture with the butylene or butenes.

For this purpose, line 74 may convey the gas mixture to condenser 76 where it may be converted into a liquid unsaturated $C_4$ hydrocarbon fraction and as such introduced into tank 78. From tank 78 it may be introduced intermittently or continuously, as desired, into the system as recycle stock, such as into admixture with the materials on their way to absorber 44.

The cuprous salt absorption medium substantially completely stripped of butylenes and stripped to a relatively minor degree of butadiene, may be withdrawn from the second stage deabsorption vessel 70 via line 82 and pump 84.

Line 86 communicates with line 82 on the outlet side of pump 84 and permits the recirculation of a portion of the absorption medium to vessel 70; if such should be desired for any reason.

The absorption medium from vessel 70 (less any portion thereof which might be recycled via line 86) may be introduced into a third vessel 88 via line 82. If desired, heat-exchanger 90 may be provided in line 82 to supply heat to the material passing therethrough.

Vessel 88 is also preferably constructed so as to be capable of withstanding a considerable superatmospheric pressure.

By the application of additional heat, or by a still further reduction in pressure, or suitably by a combination of both of these methods, the mixture contained in vessel 88 may be subjected to conditions sufficiently drastic to dissociate substantially all the remaining cuprous salt-butadiene complex and to drive off the resulting butadiene as a gas.

The butadiene thus driven off in vapor phase may be removed via line 92 which if desired may conduct the butadiene vapor to condenser 94. The condensed butadiene concentrate, suitably in liquid phase, may be removed from the system via line 96. This product comprises butadiene of a relatively high degree of purity, which may be of the order of 98% or even higher.

The cuprous salt absorption medium, substantially completely stripped of both butylenes and butadiene, may be withdrawn from vessel 88 via line 98 and pump 100.

If desired for any reason, a portion thereof may be recycled to vessel 88 by line 101 communicating with line 82.

The remaining absorption medium may be recycled to the process as shown.

In case dry cuprous salts, such as dry, finely divided cuprous chloride, is employed as the final concentrating agent, the absorber 44 may comprise a ball mill or similar unit in which both absorption and desorption opertions are conducted. Desorbers 54, 70 and 88 may be eliminated. The process comprises essentially of contacting the hydrocarbon mixture with the dry cuprous chloride at low temperatures, followed by heating stagewise to remove unreacted material and finally decompose the butadiene cuprous chloride complex to liberate the butadiene present.

Referring more particularly to Figure 2, this represents diagrammatically a modification of Figure 1 wherein the crude unsaturated $C_4$ hydrocarbon fraction is first subjected to treatment with an absorption medium such as a cuprous salt solution in suspension, or dry cuprous salt such as cuprous chloride, and the absorbing medium containing unsaturated hydrocarbons absorbed therein is subjected to stagewise deabsorption in a manner similar to that already described, after which the effluent from the second stage of deabsorption (said effluent containing substantial quantities of butadiene and isobutylene) is subjected to the selective polymerization step for selectively polymerizing butylenes, particularly isobutylene.

For convenience, like reference numerals have been applied to like elements and, for the sake of brevity, the description of the procedure in so far as it is similar will not be repeated.

The crude unsaturated C4 hydrocarbon fraction comprising the charge stock according to this modification is fed into the system via line 30, and the operation of elements 30 to 74 and 82 to 101 may be the same as that already described in connection with the correspondingly numbered elements of Figure 1.

It may be noted however that the quantities of butylenes, particularly isobutylene, in the respective effluents from the first and second stages of deabsorption of the cuprous salt solution or suspension may of course be substantially greater, due to the absence of the step of preliminarily selectively polymerizing isobutylene, present in the charge stock as was done in Figure 1.

The vapor phase effluent from the second stage of deabsorption leaves vessel 70 via line 74 and, instead of being condensed and recycled to the cuprous chloride absorption vessel 44 as in Figure 1, may be conducted directly into the acid catalyst polymerizing vessel 2. This effluent material in vapor phase contains considerable quantities of both butadiene and isobutylene, and may be subjected to selective polymerization conditions similar to those described in connection with Figure 1.

The operation of the selective polymerization unit 2 and associated equipment may be substantially the same as already described, and consequently need not be repeated. As a result of such operation, isobutylene polymer material may be withdrawn from the system via line 24 and pump 26, while a butadiene concentrate may be withdrawn from tank 18 via line 110.

Heat-exchanger 6 in line 4 of Figure 1 is omitted from line 74 of Figure 2 since the effluent from vessel 70 is already in the vapor phase. However, a heat-exchanger (not shown) may be provided in line 74 of Figure 2 if desired, and heating or cooling fluid circulated therethrough in a manner to adjust the temperature of the butadiene-butylene mixture flowing through line 74 to any desired value prior to introducing same into the polymerizing vessel 2.

As in Figure 1, the liquid phase cuprous salt concentrating process illustrated may be replaced by the dry cuprous chloride process, if desired, by suitable changes in equipment.

Figure 3 illustrates a procedure closely related to that of Figure 2 except that the selective polymerization step is applied to the effluent from the initial deabsorption step.

Here also, like reference numerals have been applied to like elements and, for the sake of brevity, the description of the procedure in so far as it is similar will not be repeated.

The crude unsaturated C4 hydrocarbon fraction comprising the charge stock according to this modification is fed into the system via line 30, and the operation of elements 30 to 58 and 64 to 101 may be the same as that already described in connection with the correspondingly numbered elements of Figure 1.

As in the case of Figure 2, it may be noted that the quantities of isobutylene, in the respective effluents from the first and second stages of deabsorption of the cuprous salt solution or suspension may of course be substantially greater than is the case following the procedure of Figure 1, due to the absence of the step of preliminarily selectively polymerizing isobutylene, present in the charge stock.

The vapor phase effluent from the initial stage of deabsorption leaves vessel 54 via line 58 and, instead of being condensed and removed from the system as olefine concentrate as in Figure 1, may be conducted directly into the acid catalyst polymerizing vessel 2. This effluent material in vapor phase contains considerable quantities of butylenes, particularly isobutylene, but relatively little butadiene, due to the conditions of deabsorption maintained in vessel 54. Consequently, the selective polymerization step conducted in polymerization unit 2 and associated equipment represents a convenient method of converting the isobutylene content of the first stage effluent into relatively more valuable liquid polymers thereof.

The operation of the selective polymerization unit 2 and associated equipment may be substantially the same as already described, and hence need not be repeated. As a result of such operation, isobutylene polymer material may be withdrawn from the system via line 24 and pump 26, while any residual butadiene and unconverted butenes may be withdrawn from tank 18 via line 110.

As in the case of Figure 2, heat-exchanger 6 in line 4 of Figure 1 is omitted from line 58 of Figure 3 since the effluent from vessel 54 is already in the vapor phase. However, a heat-exchanger (not shown) may be provided in line 58 of Figure 3 if desired, and heating or cooling fluid circulated therethrough in a manner to adjust the temperature of the butylene mixture (which may contain some butadiene) flowing through line 58 to any desired value prior to introducing same into the polymerizing vessel 2.

The second stage effluent (containing substantial quantities of both butadiene and butylenes, particularly isobutylene) may be condensed and recycled to the system such as at line 40, as previously described in connection with Figure 1.

As in Figure 1, the liquid state cuprous salt concentrating process illustrated may be replaced by the dry cuprous chloride process, if desired, by suitable changes in equipment.

Numerous modifications and variations of the foregoing procedures will become apparent to those skilled in the art from a consideration of the description herein.

Thus, the procedures of Figures 2 and 3 might be combined; i. e., the selective catalytic polymerization step might be applied to each of the vapor phase effluents from both the initial and the second deabsorption stages of operation.

On the other hand, the procedure of Figure 1 might be combined with either the procedure of Figure 2 or the procedure of Figure 3; i. e., the selective catalytic polymerization step might be applied not only to the initial charge stock as in Figure 1 but also to either of the effluents from the second or the first deabsorption stages as shown in Figure 2 or 3 (respectively).

Or the procedure of all three figures might be combined; i. e., the selective catalytic polymerization step might be applied not only to the initial charge stock as in Figure 1 but also to the effluents from the first two deabsorption stages as in Figures 2 and 3 combined.

While I have illustrated three stages of deabsorption of the cuprous salt absorption medium, obviously more stages might be employed without departing from the spirit of my invention. It is also conceivable that only two stages of deabsorption might be desirable under certain circumstances.

Also, while the mineral acid selective polymerization step has been described as carried out with the hydrocarbon feed stock in the vapor phase, liquid phase polymerization conditions might be employed by suitably adjusting the temperature and pressure conditions obtaining in the polymerizing vessel for that purpose.

Likewise, the treatment with the cuprous salt absorption medium has been described as carried out with the hydrocarbon feed stock in the liquid phase. On the other hand, by suitably adjusting the temperature and pressure conditions this portion of my procedure may be conducted with the hydrocarbon material in the vapor phase, if desired. The same applies to the dry cuprous chloride concentrating process.

In other words, any combination of liquid phase and/or vapor phase operations may be employed in practicing the component steps of my invention without departing from the spirit thereof.

The catalyst employed for the polymerization step may be any desired agent adapted to selectively convert butylenes, and particularly isobutylene, to polymer material in which the dimer preferably predominates, and in the presence of butadiene.

As such catalytic agents there may be employed mineral acids such as sulfuric and phosphoric acids. Sulfuric acid having a concentration in the range of approximately 40 to 80%, and particularly in the range of 60–75%, is very desirable for this purpose.

The polymerization temperatures are preferably correlated with the strength of acid employed and the composition of the hydrocarbon charge to the polymerization zone to yield the results described herein. Temperatures in the polymerization zone ranging from approximately 25° to 80° C. and more preferably in the range of 40 to 70° C., are suitable for the purpose.

As already indicated, the absorbing medium employed preferably comprises a heavy metal salt capable of forming complexes or addition compounds with diolefines and monoolefines. Salts of heavy metals of groups 1b and 2b of the periodic system, especially salts of such metals in their monovalent form, are suitable. For example, cuprous, mercurous and silver salts are suitable. Cuprous halides, and especially cuprous chloride, are outstanding for my present purposes.

Salts of the type described may be employed in the dry state, or suspended in an inert organic solvent, or in an aqueous medium. When aqueous solutions are employed, it may be desirable to have present an excess of the solid salt so that the absorption medium is in effect a salt slurry.

Hydrochloric acid and/or ammonium chloride may be present, if desired, to increase the solubility of the heavy metal salts in water. On the other hand, basic substances such as an ethanolamine (and particularly triethanolamine) or dissolved ammonia may be present in the metal salt absorption medium. Salts of alkali and alkaline earth metals (such as sodium chloride and calcium chloride) may likewise be present in the absorption medium. Amine salts might also be present.

Preferred absorbing systems are (1) cuprous acetate dissolved in dilute aqueous ammonia and (2) solid, dry cuprous chloride.

The pressure and temperature conditions obtaining in the absorption and deabsorption stages may be varied with considerable latitude, without departing from the spirit of the invention.

Generally speaking, superatmospheric pressures may be preferred throughout all or at least a part of the system, for at least two reasons, (a) the absorption of unsaturated hydrocarbon material in the absorber is thereby rendered relatively more complete, and (b) when deabsorbing under superatmospheric pressure conditions, the vapor phase effluents from the deabsorption zone or zones may be condensed when necessary or desired by means of ordinary surface or river water, without the necessity for special refrigeration means.

As hereinbefore indicated, if acetylenic hydrocarbons are present in the mixture to be treated in accordance with my invention, it may be preferred to subject the initial charge stock to a preliminary treatment for the removal of the acetylenics. For example, treatment with basic cuprous salt solutions (such as an ammoniacal cuprous chloride solution) permits removal of the acetylenics in the form of insoluble cuprous acetylides. Other suitable methods for removing acetylenics include treatment with freshly prepared sodamide.

For the sake of simplicity, conventional apparatus elements such as valves, vents, traps, compressors, gauges, and other apparatus elements not essential to an understanding of the process, have not been shown on the drawings nor described, since these would be supplied as a matter of course by those skilled in the art practicing the present invention.

The process may be illustrated by means of the following example.

*Example*

A 50% light oil butadiene fraction having a composition similar to that described previously was continuously charged to a vertical reaction tower containing 65% sulfuric acid at a temperature of 55° C. The butadiene fraction was introduced into the lower portion of the tower by means of a fritted glass disc.

Approximately 80% of the isobutylene present in the fraction was removed by this procedure, while less than 5% of the butadiene present was removed. Approximately ⅔ of the isobutylene removed was isolated subsequently as diisobutylene, the remainder comprising triisobutylene, with smaller proportions of higher polymers.

Upon contacting the treated butadiene with dry, finely divided cuprous chloride in a ball mill at 15° C. followed by removing unreacted material at 15–50° C., then decomposing the butadiene-cuprous chloride complex at 60–110° C., approximately 80% of the butadiene present is isolated as 98.5% butadiene.

While particular steps and procedures for separating dienes and monoolefines, particularly isoolefines, have been described, it is to be understood that these are by way of illustration only. Therefore, changes, omissions, additions, substitutions and/or modifications may be made within the scope of the claims without departing from the spirit of the invention.

I claim:

1. A process for the separation of diolefine material from a mixture thereof with monoolefine material, including isoolefine material, which comprises contacting said mixture with an absorption medium under conditions of temperature and pressure such that both diolefine material and monoolefine material, including mono-isoolefine material, are absorbed therein; subjecting said absorption medium containing absorbed material in a plurality of deabsorption stages to increasingly drastic conditions of deabsorption, thereby obtaining at least one fraction containing substantial quantities of both diolefine material and monoolefine material, including isoolefine material, and at least one fraction of relatively concentrated diolefine material, subjecting said first-mentioned fraction containing substantial quantities of both diolefine material and monoolefine material to selective polymerization conditions sufficiently drastic to polymerize at least a preponderant portion of said monoolefine material, including said isoolefine material, but insufficiently drastic to affect a large portion of said diolefine material; and separating monoolefine polymerization products from the resulting mixture, the remaining portion of said resulting mixture constituting additional relatively concentrated diolefine material.

2. A process for the separation of butadiene from admixture with C₄ monoolefine material, including isobutylene, which comprises contacting said mixture with an absorption medium under conditions of temperature and pressure such that both butadiene and isobutylene are absorbed therein; subjecting said absorption medium containing absorbed material in a plurality of deabsorption stages to increasingly drastic conditions of deabsorption, thereby obtaining at least one fraction containing substantial quantities of both butadiene and isobutylene, and at least one fraction of relatively concentrated butadiene; subjecting said first-mentioned fraction containing substantial quantities of both butadiene and isobutylene to selective polymerization conditions sufficiently drastic to polymerize isobutylene to polymer including diisobutylene, but insufficiently drastic to affect a large portion of said butadiene; and separating isobutylene polymer from the resulting mixture, the remaining portion of said resulting mixture constituting additional relatively concentrated butadiene.

3. A process for the separation of butadiene from a hydrocarbon mixture containing in admixture therewith butenes, including isobutylene, which comprises contacting said mixture with an absorption medium comprising a monovalent salt of a metal of the group consisting of copper, mercury and silver under conditions of temperature and pressure such that both butadiene and isobutylene are absorbed therein; subjecting said absorption medium containing absorbed material in a plurality of deabsorption stages to increasingly drastic conditions of deabsorption, thereby obtaining at least one fraction containing substantial quantities of both butadiene and isobutylene, and at least one fraction of relatively concentrated butadiene; subjecting said first-mentioned fraction containing substantial quantities of both butadiene and isobutylene to selective polymerization in the presence of a mineral acid catalyst and under conditions sufficiently drastic to polymerize isobutylene to polymer including diisobutylene, but insufficiently drastic to affect a large portion of said butadiene; and separating isobutylene polymer from the resulting mixture, the remaining portion of said resulting mixture constituting additional relatively concentrated butadiene.

4. A process for the separation of butadiene from a hydrocarbon mixture containing in admixture therewith butenes, including isobutylene, comprising contacting said mixture with an absorption medium comprising cuprous chloride under conditions of temperature and pressure such that butadiene and isobutylene are absorbed therein; subjecting said absorption medium containing absorbed material in a plurality of deabsorption stages to increasingly drastic conditions of deabsorption, thereby obtaining at least one fraction containing substantial quantities of butadiene and isobutylene, and at least one fraction of relatively concentrated butadiene; subjecting said first-mentioned fraction containing substantial quantities of butadiene and isobutylene to selective polymerization in the presence of sulfuric acid as catalyst under conditions sufficiently drastic to polymerize isobutylene to polymer including diisobutylene, but insufficiently drastic to affect a large portion of said butadiene; and separating isobutylene polymer from the resulting mixture, the remaining portion of said resulting mixture constituting additional relatively concentrated butadiene.

5. A process for the separation of butadiene from a hydrocarbon mixture containing butadiene and butenes including isobutylene, comprising contacting said mixture with an absorption medium comprising a monovalent salt of copper under conditions of temperature and pressure such that butadiene and C₄ monoolefine material, including isobutylene, are absorbed therein; subjecting said absorption medium containing absorbent material in at least three separation stages to increasingly drastic conditions of separation, thereby obtaining (a) at least one C₄ monoolefine fraction relatively low in butadiene content (b) at least one fraction containing substantial quantities of butadiene and isobutylene, and (c) at least one fraction of relatively concentrated butadiene; subjecting said fraction (b) containing substantial quantities of butadiene and isobutylene to selective polymerization in the presence of sulfuric acid as catalyst under conditions sufficiently drastic to polymerize isobutylene to polymer including diisobutylene, but insufficiently drastic to affect a large portion of said butadiene; and separating isobutylene polymer from the resulting mixture, the remaining portion of said resulting mixture constituting additional relatively concentrated butadiene.

6. A process for the separation of butadiene from a hydrocarbon mixture containing butadiene and butenes including isobutylene, comprising contacting said mixture with an absorption medium comprising a monovalent salt of copper under conditions of temperature and pressure such that butadiene and C₄ monoolefine material, including isobutylene, are absorbed therein; subjecting said absorption medium containing absorbed material in at least three separation stages to increasingly drastic conditions of separation, thereby obtaining (a) at least one C₄ monoolefinic fraction relatively low in butadiene content, and containing isobutylene, (b) at least one fraction containing substantial quantities of butadiene and C₄ monoolefine material, including isobutylene, and (c) at least one fraction of relatively concentrated butadiene; subjecting said fraction (a) containing a substantial quantity of C₄ monoolefine material, including isobutylene, but relatively low in butadiene content to selective polymerization in the presence of sulfuric acid as catalyst under conditions sufficiently drastic to polymerize isobutylene to polymer including diisobutylene; separating isobutylene polymer from the resulting mixture, the remaining portion of said resulting mixture containing residual unsaturated C₄ hydrocarbon material; and recycling said fraction (b) containing substantial quantities of butadiene and C₄ monoolefine material to the cuprous salt-unsaturated hydrocarbon contacting zone for further separation of butadiene and C₄ monoolefine material contained in said fraction.

FRANK J. SODAY.

REFERENCES CITED

The following references are of record in the file of this patent:

UNITED STATES PATENTS

| Number | Name | Date |
|---|---|---|
| 1,999,159 | Van Peski | Apr. 23, 1935 |
| 2,230,274 | Soday | Feb. 4, 1941 |
| 2,271,092 | Perkins et al. | Jan. 27, 1942 |
| 2,318,988 | Craig | May 11, 1943 |
| 2,322,281 | Craig | June 22, 1943 |
| 1,988,479 | Brooks | Jan. 22, 1935 |
| 2,058,851 | Brooks | Oct. 27, 1936 |
| 2,348,931 | Schulze | May 16, 1944 |
| 2,336,643 | Schulze | Dec. 14, 1943 |
| 1,962,525 | Richardson | June 12, 1934 |
| 2,369,559 | Gilliland | Feb. 13, 1945 |
| 2,007,159 | Engs et al. | July 9, 1935 |
| 2,007,160 | Engs et al. | July 9, 1935 |

FOREIGN PATENTS

| Number | Country | Date |
|---|---|---|
| 703,743 | France | Feb. 10, 1931 |

OTHER REFERENCES

Marcovitch et al., Nat'l Pet. News, Oct. 14, and 21, 1931, "Reaction Velocity of Sulfuric Acid with Unsaturated Hydrocarbons." Reprint in 260—683.15, 9 pages.

Lur'e et al., Sintet Kauchuk (1934), No. 6, pages 19–29. Translation in 260—681.5, 35 pages.

Hainsworth et al., J. A. C. S. 43, 1 (1921).